April 7, 1942. D. J. HARRINGTON 2,279,042
SCREENING APPARATUS
Filed Aug. 3, 1940 5 Sheets-Sheet 2
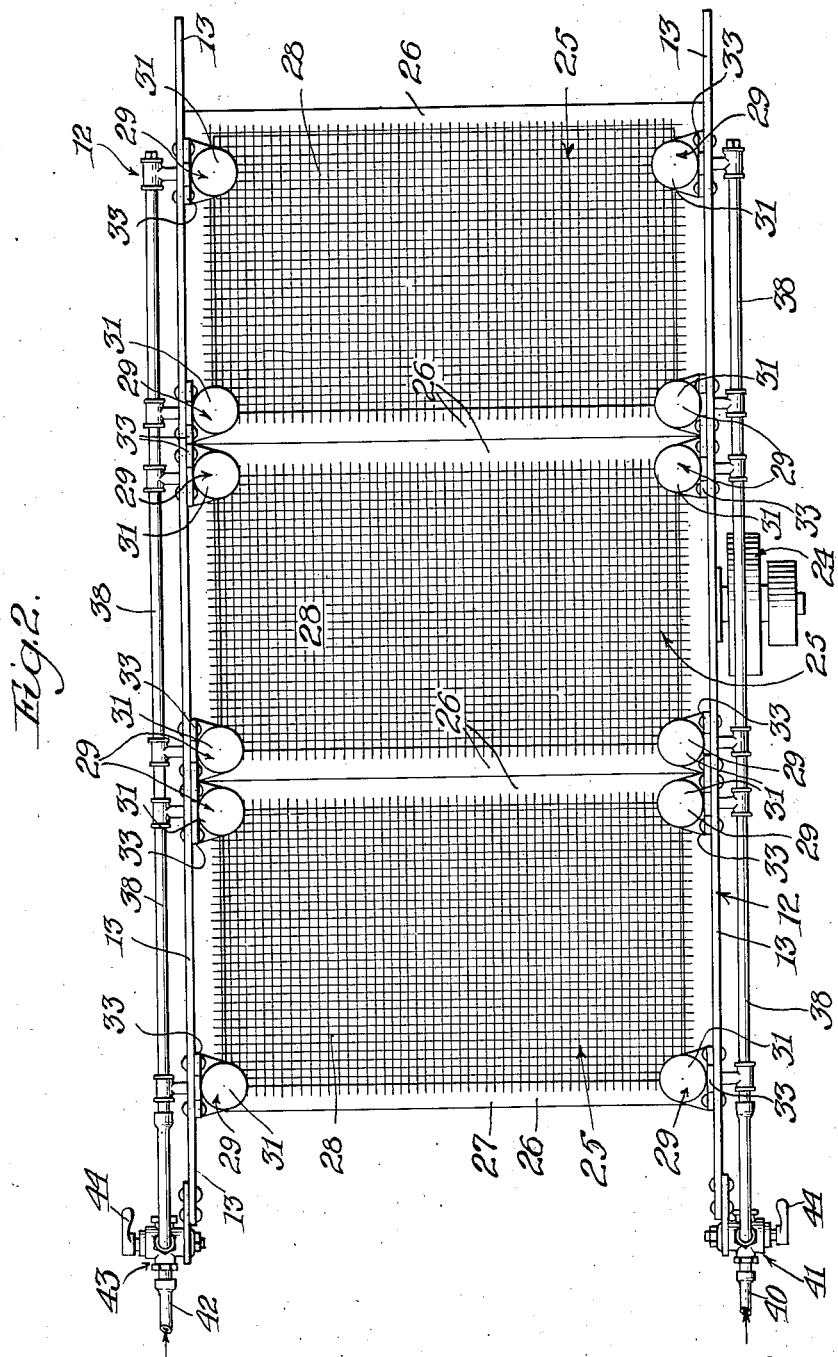
Inventor:
Daniel J. Harrington,
By Chritton, Wiles, Davies, Kirschl & Dawson,
Attys

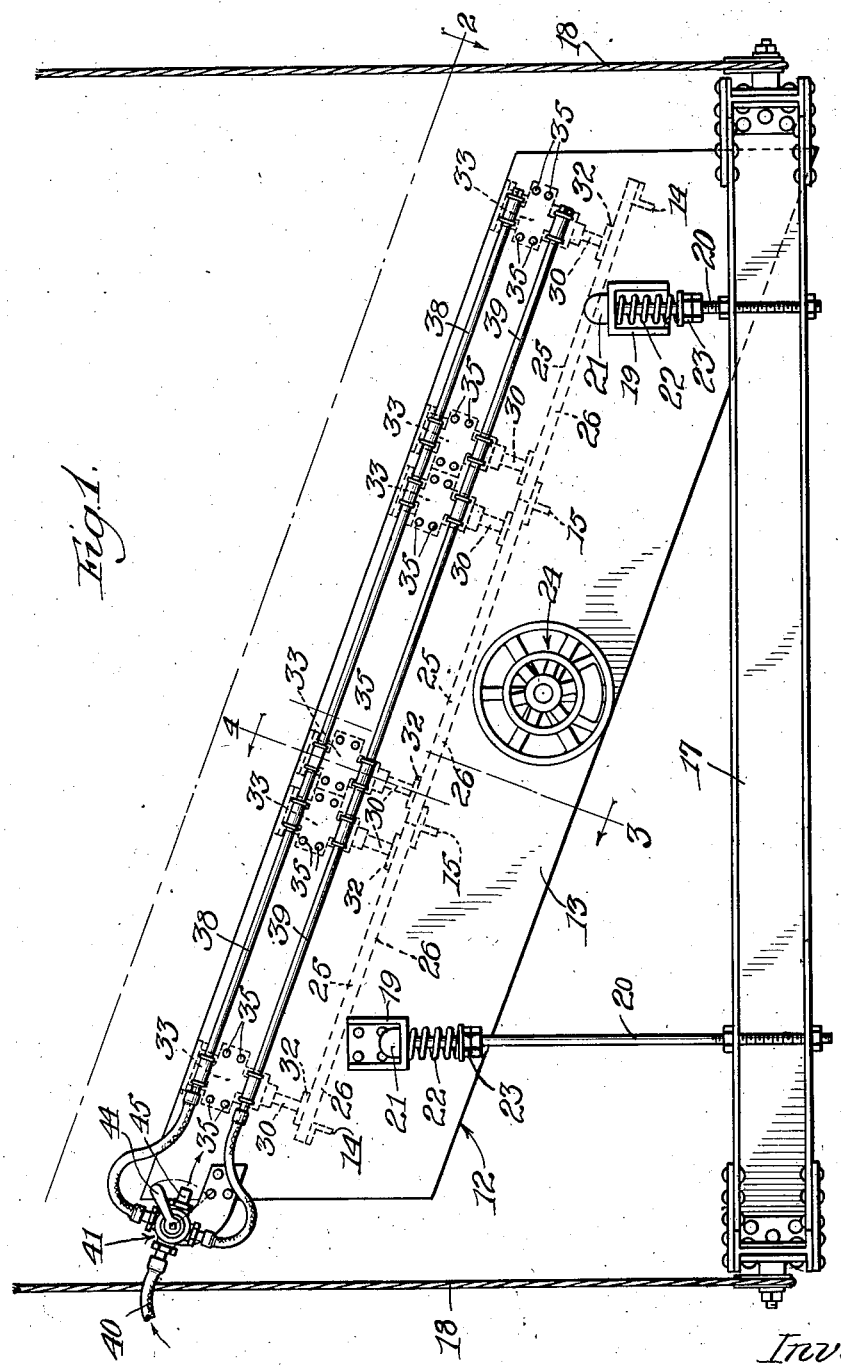

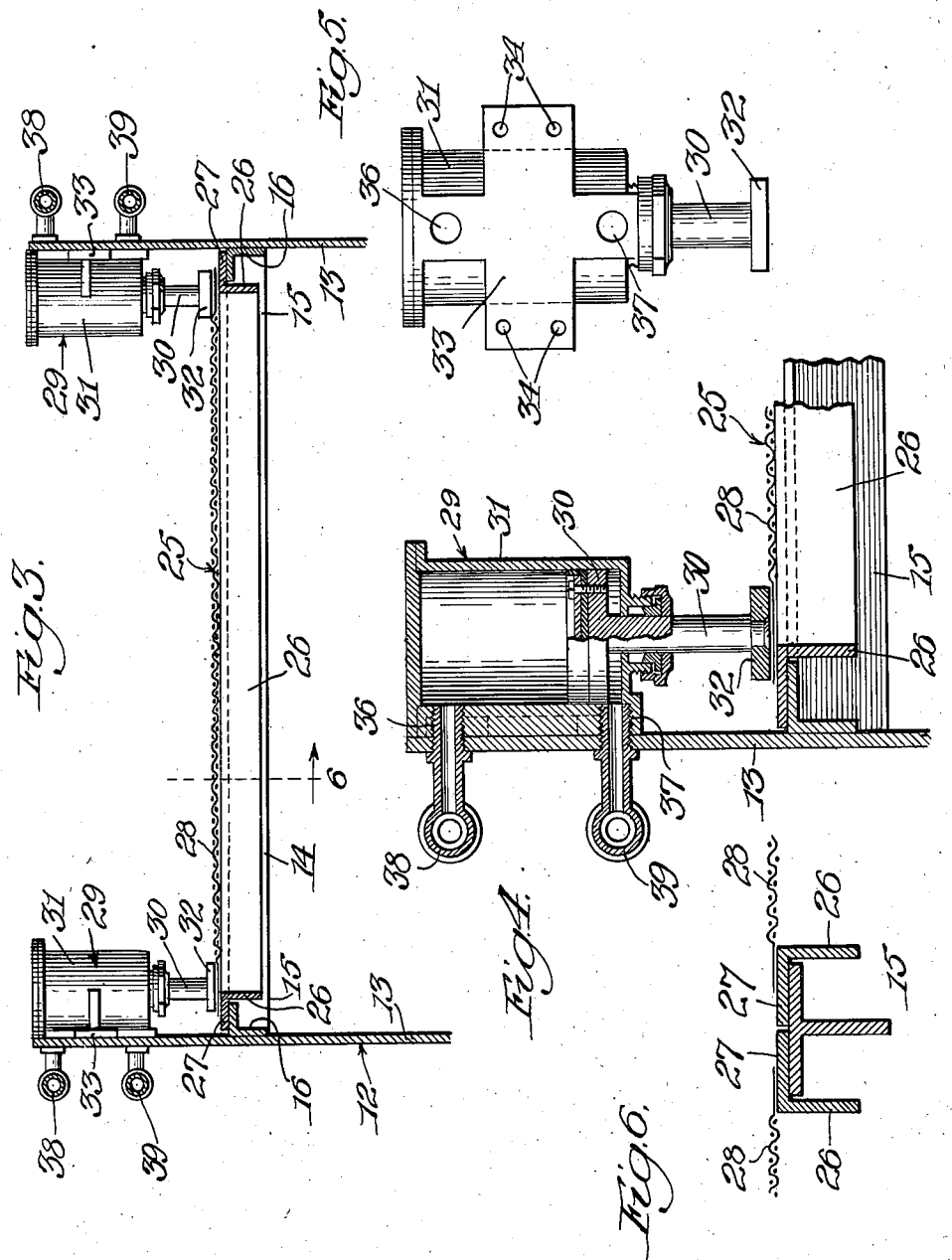

April 7, 1942. D. J. HARRINGTON 2,279,042
SCREENING APPARATUS
Filed Aug. 3, 1940 5 Sheets-Sheet 4
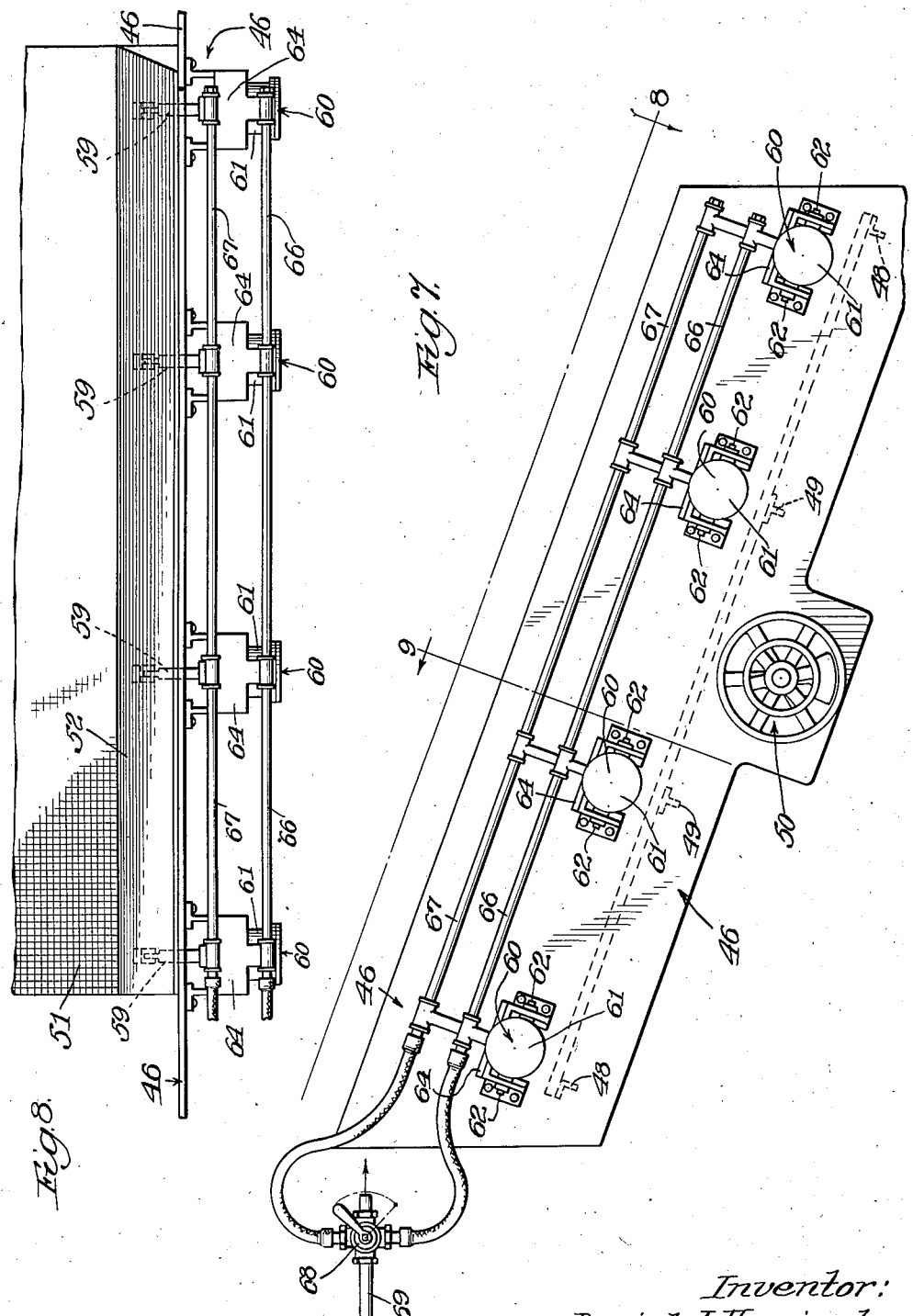
Inventor:
Daniel J. Harrington,
By Chritton, Wiles, Davies, Hirschl & Dawson,
Attys April 7, 1942.                D. J. HARRINGTON                2,279,042
                              SCREENING APPARATUS
                              Filed Aug. 3, 1940            5 Sheets-Sheet 5
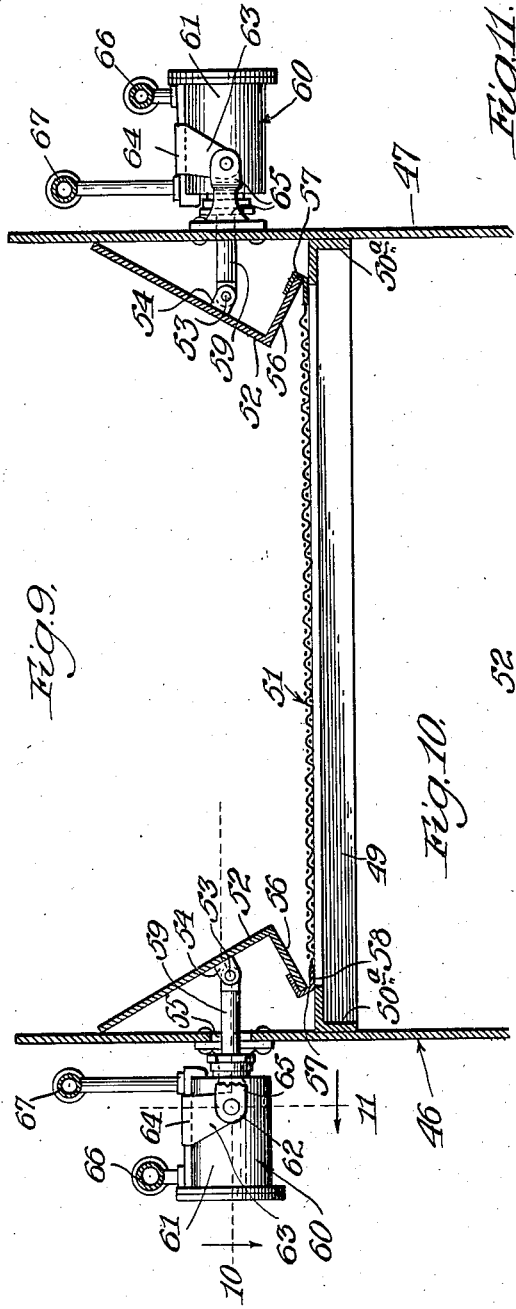
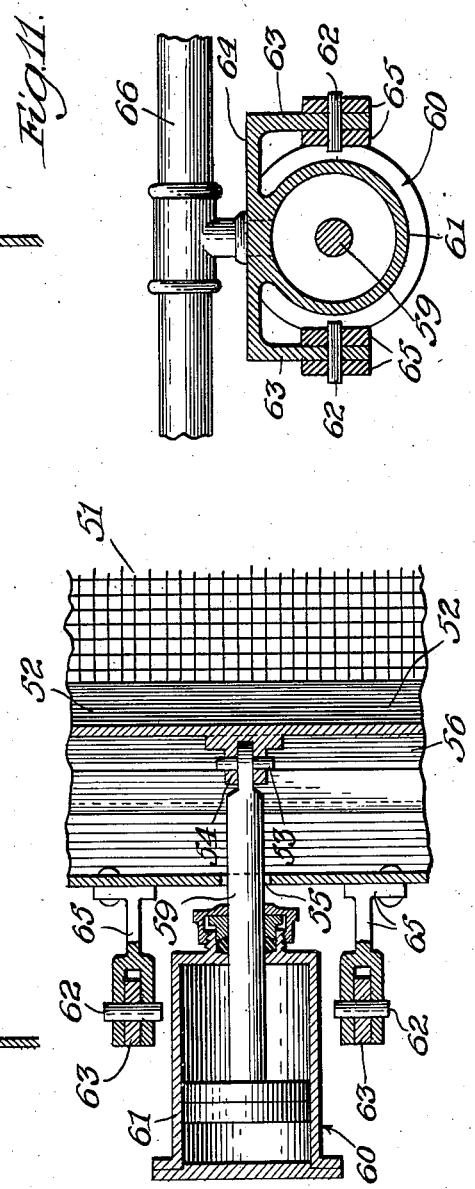
Inventor:
Daniel J. Harrington,
By Chritton, Wiles, Davies, Hirschl & Dawson,
Attys Patented Apr. 7, 1942

2,279,042

UNITED STATES PATENT OFFICE 2,279,042

SCREENING APPARATUS

Daniel J. Harrington, Manistique, Mich., assignor to Inland Lime & Stone Company, Manistique, Mich., a corporation of Michigan Application August 3, 1940, Serial No. 350,757

5 Claims. (Cl. 209—403)

My invention relates to improvements in screening apparatus, such as for example and more particularly, that type of apparatus in which provision is made for shaking or vibrating the portion of the apparatus upon which the material to be screened is supported.

Such apparatus as commonly provided includes a screen element or elements releasably secured to a vibrating screen body, forming a supporting structure for the screen element or elements, by fastening devices, such as for example bolts, which present a number of objections certain of which are that the fastenings often become loose (resulting in the subjecting of the supporting structure to objectionable impact by the screen element or elements) and that oftentimes the fastenings become lost.

My object is to overcome the objections presented by the means hitherto used for holding the screen element or elements in place, and provide for easily and quickly securing the screen element or elements in place on the supporting structure and preferably easily and quickly releasing the screen element or elements from the supporting structure when desired.

I have chosen to illustrate my invention as embodied in a screening apparatus which, as to its general features of construction, is well known in the art, a description of the accompanying drawings being as follows:

Figure 1 is a view in side elevation of such a screening apparatus embodying my invention.

Figure 2 is a plan view along the line 2 on Fig. 1 viewing the structure in the direction of the arrow.

Figure 3 is a fragmentary sectional view of the apparatus, the section being taken at the line 3 on Fig. 1 and viewed in the direction of the arrow.

Figure 4 is an enlarged fragmentary sectional view, the section being taken at the line 4 on Fig. 1 and viewed in the direction of the arrow.

Figure 5 is a view in elevation of one of the similar fluid-pressure operated devices for holding the screen elements in place.

Figure 6 is an enlarged fragmentary sectional view, the section being taken at the line 6 on Fig. 3 and viewed in the direction of the arrow.

Figure 7 is a view in side elevation of a screening apparatus constituting another embodiment of my invention.

Figure 8 is a plan view of one side portion of the apparatus of Fig. 7, the structure being viewed along the line 8 on Fig. 7 in the direction of the arrow.

Figure 9 is an enlarged cross-sectional view of the apparatus of Figs. 7 and 8, the section being taken at the line 9 on Fig. 7 and viewed in the direction of the arrow.

Figure 10 is an enlarged fragmentary sectional view, the section being taken at the line 10 on Fig. 9 and viewed in the direction of the arrow; and Figure 11, an enlarged fragmentary sectional view, the section being taken at the line 11 on Fig. 9 and viewed in the direction of the arrow.

Referring to the construction shown in Figs. 1–7, inclusive, it comprises in accordance with common practice a screen body 12 forming a supporting structure shown as formed of spaced apart substantially parallel upwardly extending side plates 13 connected together by spaced apart end cross-members 14 in the form of angle bars and intermediate cross members 15 in the form of T bars, the plates 13 being provided along their inner surfaces with parallel cleats 16 shown as in the form of angle bars which, with the bars 14 and 15, in the particular construction shown, form seats for screen-elements hereinafter referred to; the structure described being in the form of a trough to receive the material to be screened.

The supporting structure 12 which, with its screen elements referred to, is vibrated in use, is spring supported on a rectangular frame 17 supported in accordance with common practice by cables at its corners, the cables for the two corners shown being indicated at 18, the illustrated spring supporting means comprising pairs of brackets on the plates 13 (those at one side of the apparatus being shown at 19), rods 20 rigidly secured at their lower ends to the frame 17 and extending upwardly through openings in the brackets and on which the brackets are slidable, the upper ends of the rods 20 having heads 21, and springs 22 surrounding the rods and confined between the brackets and stops 23 on the rods.

Suitable means for vibrating the supporting structure 12 and its screen elements referred to are provided in accordance with common practice, such means being shown at 24 and operating, when actuated, to vibrate the structure supported on the springs 22.

The apparatus also comprises the screen elements referred to and represented at 25, it being understood that, if desired, the desired screening area may be provided by a single screen element instead of a plurality thereof as shown.

The screen elements shown each comprise a rectangular frame 26 shown as formed of angle bars with their horizontal flanges 27 outwardly extending and a sheet 28 of screen material extending across the opening in the frame 26 and secured to the latter in any suitable way, as for example by welding it thereto.

The screen elements seat at the flanges 27 on the seats provided therefor on the supporting structure 12,—in the particular construction shown on the cleats 16 and the cross members 14 and 15.

In accordance with this illustrated embodiment of my invention I provide for the releasable securing of the screen elements in place on the seats of the structure 12 by means of power-operated devices.

In the particular construction now being described these power-operated devices are in the form of fluid-pressure operated cylinder and piston devices 29 carried by the supporting structure 12 and which, when operated, engage at their pistons 30 with the frames 26 of the screen elements and clamp these frames securely against the seats.

The piston and cylinder devices 29 are shown as secured at their cylinders 31 to the plates 13 in spaced apart relation therealong, each frame 26 being shown as engaged at each of its opposite end edges by the pistons of two of these devices at foot plates 32 thereon, adjacent the extremities of these end edges.

The cylinders 31 of the cylinder and piston devices 29 which preferably are double-acting as represented, are shown as provided with bracket portions 33 having openings 34 to receive fastening devices 35 for securing them to the plates 13, and ports 36 and 37, respectively, above and below the pistons 30.

The ports 36 and 37 of the cylinders at each side of the apparatus are connected with header pipes 38 and 39, respectively, which communicate with any suitable source of pressure medium, as for example compressed air or liquid under pressure, the flow of which to the ends of the cylinders is controlled by any suitable means.

In the construction shown the header pipes 38 and 39 at one side of the apparatus are connected with the pressure medium supplied through a pipe 40 opening into a control valve 41 and the header pipes 38 and 39 at the opposite side of the apparatus are connected with the pressure medium supplied through a pipe 42 opening into a separate control valve 43, though it will be understood that all of the header pipes 38 and 39 may, if desired, connect with a single controlling valve connected with the source of pressure medium.

Each of the valves 41 and 43 may be of the common 4-way type each operating when the actuating handle 44 thereof is in the position shown in Fig. 1, to supply pressure medium to the header pipe 38 with which the valve is connected and thus to the upper ends of those of the cylinders 31 which are in communication with this pipe and open the lower ends of these cylinders through the header pipe 39 to exhaust through the port 45 of the valve to force the screen elements 25 against the seats on the supporting structure 12 adjacent these cylinders and maintain them in this position; and when the actuating handle 44 is swung down, to connect the lower ends of these cylinders with the source of pressure medium and open the upper ends of these cylinders to the exhaust port 45, to lift the pistons 30 in these cylinders clear of the screen elements.

Referring to the construction shown in Figs. 7 to 11, inclusive, it involves a screen body, or supporting structure, 46, formed of spaced apart vertical side plates 47 connected together by end cross members 48 and intermediate cross members 49 and side cleats 46a shown as angle irons.

The supporting structure 46, which may be spring supported as in the case of the structure shown in Fig. 1, has vibrating means represented at 50 as in the case of the structure of Fig. 1.

The supporting structure 46 also involves screening means shown in this particular construction as a single screen element 51, but which may be provided, if desired, in sections.

In accordance with this embodiment of my invention the screen element 51 is held in place on the structure formed of the plates 47 and cross members 48 and 49 by means which exert a pulling action on the screen element in a direction transversely thereof in a plane parallel to that in which the cross members 48 and 49 are located.

Preferably this pulling action is exerted on opposite edges of the screen element in opposite directions and accordingly means so operating are shown.

These pulling or tautening means are shown as comprising a pair of plates 52 located at the inner sides of the plates 47 and pivoted at 53 between their upper and lower edges at studs 54 thereon, to the outer ends of actuating members shown as piston hereinafter referred to, and extending freely through openings 55 in the plates 47. The plates 52 at their lower edges have outwardly directed flanges 56 which extend into inwardly opening channels 57 in opposite edges of the screen element 51, these channels being provided either by the channel strips, shown at 58, secured to these edges of the sheet of screening material, or by bending back the screen sheet itself to form the channels.

In the particular arrangement shown the actuating members for the plates 52 are the pistons 59 of cylinder and piston devices 60 and operated by any suitable pressure medium as in the case of the construction shown in the preceding figures of the drawings.

The cylinders of the devices 60 and represented at 61 are pivotally supported, as indicated at 62, at the arms 63 of yokes 64 carried by the cylinders 61, on brackets 65 fixed on the plates 47.

The opposite ends of the cylinders 61 communicate with a valved supply of any suitable pressure medium as described of the construction shown in the preceding figures of the drawings. Thus the cylinders 61 at one side of the apparatus connect at opposite ends with header pipes 66 and 67, respectively, and the cylinders at the opposite side connect at opposite ends with such header pipes 66 and 67, these sets of pipes being in communication with a suitable source of pressure medium under the control of separate valves, respectively, as in the case of the header pipes 38 and 39, or a single valve, as above suggested, the control valve for one set of the header pipes 66 and 67 and of the same construction as the valves 41 and 43 being shown at 68 and the pipe leading from the source of pressure medium to the valve 68, at 69.

To draw the screen element 51 taut and hold it in this position the pressure medium is introduced into the cylinders 61 through the header pipes 67 and the outer ends of the cylinders vented through the header pipes 66. In this operation the pistons 59 are retracted causing the plates 52 to swing outwardly at their lower edges, fulcruming at their upper edges on the plates, and pulling outwardly on the edges of the screen element 51 to render it taut, and applying a component of downward pressure to hold the screen in contact with its seat on frame 50a.

To release the screen element 51 for removal, the pressure medium is introduced into the outer ends of the cylinders 61 through the header pipes 66 and the pressure medium at the inner ends of the cylinders vented through the header pipes 67, the plates 52 in this operation swinging inwardly to release the screen element.

While I have illustrated and described certain particular embodiments of my invention I do not wish to be understood as intending to limit it thereto as the constructions shown may be variously modified and altered and the invention embodied in other forms of structure without departing from the spirit of my invention. In this connection it may be said that while I prefer to provide for the pulling of the screen element in opposite directions at opposite edges as shown in Figs. 8-11 to secure it in position such is not necessary in carrying out my invention as one edge of the screen element may be anchored in any suitable way and all of the pulling force be exerted against its opposite edge.

What I claim as new and desire to secure by Letters Patent, is:

1. In screening apparatus, the combination of a vibratable frame, screen seats carried by the frame, a screen free of connection with said frame, a cylinder carried by said frame, a piston in said cylinder, a conduit for fluid pressure supply to said cylinder and means actuated by said piston to apply a component of force upon a marginal portion of said screen to press said portion against said seat during maintenance of pressure in said cylinder.

2. In a screening apparatus of the type wherein a screen carrying frame is vibrated during the screening operation, means for clamping the screen upon the frame for quick release, comprising in combination: a plurality of fluid pressure cylinders; pistons working in said cylinders each having a piston rod projecting therefrom; clamping means actuated by said rods to clamp the screen upon the frame at spaced locations along at least one margin of the screen; fluid pressure supply means common to said cylinders along at least one margin of the frame; and means to control the fluid pressure supply to simultaneously apply and release all clamping means along at least one margin of the frame.

3. The combination of claim 2 in which the fluid pressure means is connected to said cylinders at both sides of the pistons and in which the control means acts to introduce fluid pressure selectively to the chosen sides of the pistons to effect power actuated release as well as power actuated clamping of the screen simultaneously at the various locations.

4. In a screening apparatus of the type wherein a screen carrying frame is vibrated during the screening operation, means for clamping the screen upon the frame for quick release, comprising in combination: a plurality of fluid pressure cylinders mounted at spaced locations along at least one side of the frame; pistons working in said cylinders having rods extending into the space above the screen; hook means engaging a margin of the screen with said rods at spaced locations; readily releasable means anchoring the opposite margin of the screen; fluid pressure supply means common to said cylinders and means to control said common supply means to simultaneously apply the tautening strain on said screen at said spaced locations.

5. In a screening apparatus of the type wherein a screen carrying frame is vibrated during the screening operation, means for clamping the screen upon the frame for quick release, comprising in combination: seats for the screen carried by said frame; sides of the frame projecting above said seats; fluid pressure cylinders pivotally mounted exteriorly of at least one of said sides, at spaced locations therealong on axes parallel with the plane of the screen; pistons working in said cylinders having rods projecting through the adjacent side of the frame; plate means having pulling engagement with a margin of the screen, sloping therefrom to contact with said adjacent side of the frame and pivotally attached to said rods; and common means to control fluid pressure in said cylinders to exert pulling pressure on the adjacent margin of the screen.

DANIEL J. HARRINGTON.